United States Patent [19]

Easter et al.

[11] Patent Number: 5,530,749
[45] Date of Patent: Jun. 25, 1996

[54] METHODS AND APPARATUS FOR SECURE HARDWARE CONFIGURATION

[75] Inventors: Randall J. Easter; Vincent A. Spano; Myron W. Zajac; John E. Campbell, all of Duchess County, N.Y.

[73] Assignee: International Business Machines Corporation, Armonk, N.Y.

[21] Appl. No.: 458,903

[22] Filed: Jun. 2, 1995

Related U.S. Application Data

[62] Division of Ser. No. 290,697, Aug. 15, 1994.

[51] Int. Cl.$^6$ ........................................ H04L 9/00
[52] U.S. Cl. ........................ 380/3; 380/4; 380/52
[58] Field of Search ........................ 380/52, 3, 4

[56] References Cited

U.S. PATENT DOCUMENTS 4,817,140  3/1989  Chandra et al. ................ 380/4
5,148,534  9/1992  Comerford ..................... 380/4

Primary Examiner—David C. Cain
Attorney, Agent, or Firm—Lynn L. Augspurger; C. Lamont Whitham

[57] ABSTRACT

Methods and apparatus are provided for electronically configuring hardware features and options. A computer chip encoding method is provided in which a predetermined code or encryption sequence is uniquely associated with a computer chip. This code is used to modify a hardware configuration by enabling new features or options. The systems and methods reduce manufacturing and inventory costs by allowing a generic product to be produced which is then customized to meet the needs of the user. In addition, features and options of a data processing system can be dynamically upgraded without interruption of service or hardware replacement.

11 Claims, 4 Drawing Sheets

250 — USE Ks1 FROM CHIP TO DECIPHER [Kp1[Ks1(C) XOR Nc1]] WHICH IS PASSED TO CHIP. OBTAIN [Ks1(C) XOR Nc1]

252 — XOR Nc1 WITH [Ks1(C) XOR Nc1] OBTAIN Ks1(C).

254 — USE Kp1 TO DECIPHER Ks1(C)

256 — COMPARE PASSED IN CONFIGURATION CONSTANT TO CONFIGURATION CONSTANT ON CHIP

258 — IF CONFIGURATION CONSTANTS MATCH, LOAD NEW CONFIGURATION INTO CONFIGURATION REGISTER.

METHODS AND APPARATUS FOR SECURE HARDWARE CONFIGURATION

CROSS REFERENCE TO RELATED APPLICATION

This application is a divisional of application Ser. No. 08/290,697 filed Aug. 15, 1994.

BACKGROUND OF THE INVENTION

Field of the Invention

The present invention generally relates to methods and apparatus for electronically and securely configuring hardware features and options and, more particularly, to a configuration which contains a predetermined code or encryption sequence on a computer chip which is used to selectively enable the function features of the chip.

Description of Related Art

At present, it is standard for a variety of models of computers to be offered, each with different capabilities and features. This is true for each type of computer, from a personal computer to large mainframe and super computers. However, this wide variety of choices results in the requirement that each variation and model must be manufactured and kept in inventory.

In particular, it is common for a specific computer to be offered with various configurations of a multichip module or single chip assembly which each include different features and capabilities. Each module or chip assembly could include different numbers of control processors and feature chips. At present, each configuration of a module or chip assembly is manufactured and must be stocked in inventory to meet the demands of customers who desire the option of variations in functional characteristics or capabilities of a computer system. However, it is apparent that computer manufacturers would realize large efficiencies and economies by reducing the number of models manufactured.

In addition, a computer is generally sold with a particular configuration which meets the current needs of a computer user. The computer can usually be upgraded, modified or repaired as needed to meet the increased needs of the customer. At present, it is common for a new hardware unit to be added to the computer system to upgrade the hardware features or options. Often, a new or additional multichip module must be installed. The installation of the new hardware often must be performed off-site and so the customer must do without the computer system while the appropriate hardware is added or removed. In other instances, the configuration can be done on site but requires extensive configuration of the hardware. The loss of the use of the computer can result in financial loss and usually causes an interruption in the customer's business. Furthermore, similar problems result from failures in hardware elements.

In the past, off chip configurations have been used to store information for enabling features of a circuit. However, these systems are not completely secure since the information or code o can be intercepted from the chip interface. In addition, a separate key chip can be used to provide security for single chip modules. The single chip modules are becoming more common as the density of a chip increases, so that multiple processors and/or features are present on a single chip Therefore, methods and apparatus which allow for the implementation of numerous combinations of functional characteristics or capabilities for a computer system or a multi chip module would be advantageous. It would also be beneficial to perform the configuration electronically and securely.

SUMMARY OF THE INVENTION

It is therefore an object of the present invention to provide methods and apparatus for secure electronic configuration of hardware in a computer system.

It is another object of the present invention to provide methods and apparatus which allow hardware features and options to be selectively enabled.

It is also an object of the present invention to provide methods and apparatus for dynamic feature or option upgradability.

It is a further object of the present invention to provide methods and apparatus for secure configuration of features and capabilities which are on the computer chip which is to be configured.

According to the invention, methods and apparatus are provided for electronically configuring hardware features and options. In particular, methods in a computer chip are encoded using a fusible array and/or encryption techniques. In a first embodiment, computer chips are provided which use a set of interconnected wires with a pattern unique to each chip to represent a series of codes which can be used to selectively enable particular features and options of a computer system. The codes on the chip include a unique portion which is readable and a unique portion which is not readable. In a second embodiment, a unique encrypted key is burnt into a computer chip. This key is used in combination with configuration information to enable or modify the configuration of hardware features or options.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
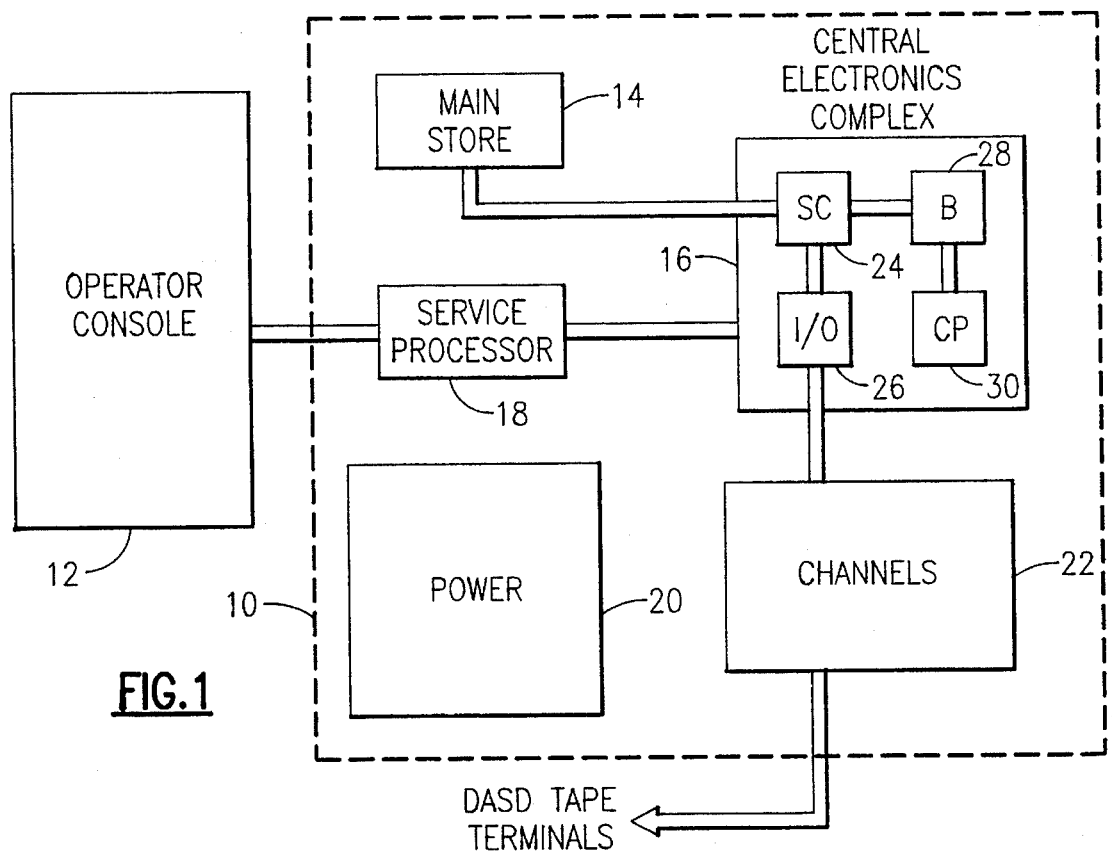
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer such as the International Business Machines (IBM) Corporation's PS/2 Personal Computers; a workstation such as IBM's RS/6000 Workstations or a mainframe computer such as the IBM System /390.

As shown, the computer 10 is connected to an operator console 12 in a manner well known in the art. In addition, there can be included a main electronic storage 14 and a central electronics complex 16. The central electronics complex can include one or more multichip modules or a single high density circuit with integrated circuit devices equivalent to several million transistors. A service processor 18 is preferably included between the operator console 12 and the central electronics complex 16 and provides access to the functions and circuitry within the complex. In addition, a power supply 20 and input/output (I/O) channels 22 or adapters are generally provided as will be understood by those skilled in the art. The I/O channels are preferably connected to one or more Direct Access Storage Devices (DASDs), such as a diskette, tape storage devices, printers, terminals, disk drives or other similar devices.

The central electronics complex, as shown in FIG. 1, generally includes four or more multichip modules. In the example shown in FIG. 1, the central electronics complex includes a session control (SC) module 24 which buffers and controls the flow of data between the main store 14, the input/output (I/O) module 26 and the processors in the computer or data processing system 10. The input/output module 26 preferably controls and buffers data between I/O channels 22 and the main store 14, as is well understood by those of skill in the art. The buffer (B) module 28 is preferably provided to buffer and control instructions and data used by the central processor and (CP) module 30 executes instructions within computer 10. As is well understood by those skilled in the art, each of the multichip modules, 24, 26, 28, and 30 is a highly complex electronic module which can include greater than one hundred integrated circuit devices, each of which is equivalent to thousands or millions of transistors. It should also be understood that the multichip modules discussed and shown are merely representative of the type and number of modules which may be included.

Figure 2:
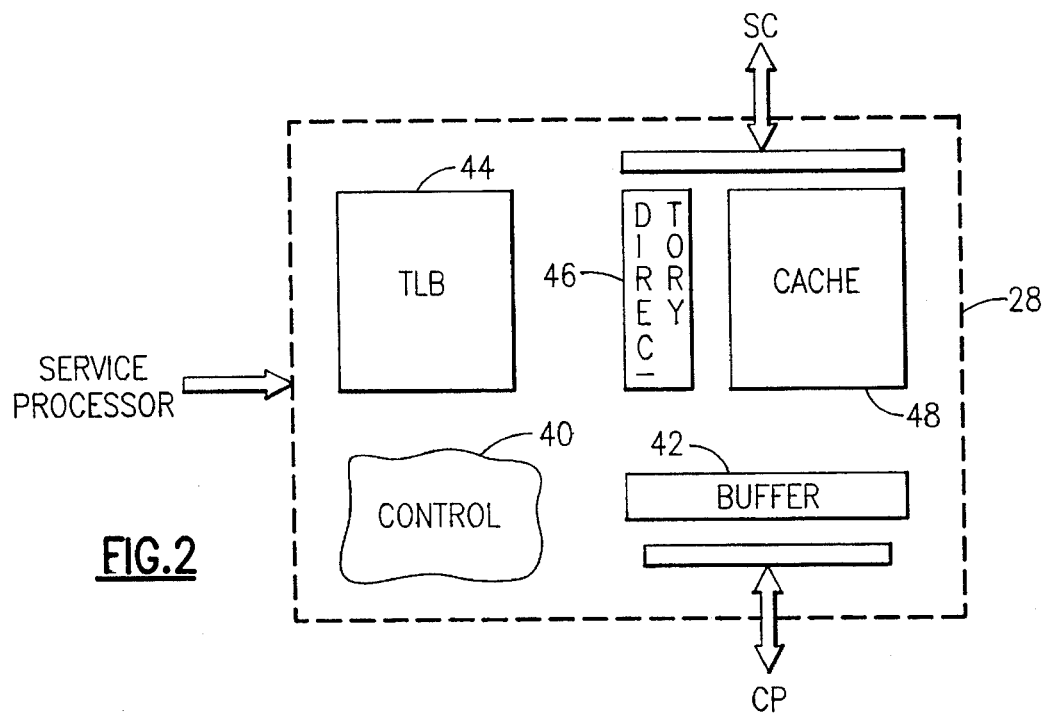
FIG. 2 is a diagram providing a high level functional overview of a representative multichip module (B) as shown in the central electronics complex of the computer system shown in FIG. 1.

FIG. 2 provides a high level schematic representation of one multichip module, the buffer (B) module, from the central electronics complex 16 of FIG. 1. As shown, various control functions 40 are implemented by this multichip module. A buffer 42 is provided to buffer instructions and data from the CP module discussed above. In addition, generally a directory 46 and cache 48 are provided to buffer and control the data between the B module and the SC module. It is also generally understood that a translation lookaside buffer (TLB) 44 will be provided for translating virtual memory addresses into real memory addresses with the main store or other portions of the computer or data processing system. Therefore, it should be understood that the functional characteristics or features of the computer 10 can be modified and controlled by varying the capabilities and circuitry of a multichip module.

A customizable computer chip is used to selectively enable or configure features or functions of a multichip module. The invention can also be used on single chip modules wherein more than one process is contained within a single chip. In a first embodiment, each of the features, processors or functions is associated with a fusible array on the chip. A fusible array is a set of wires which are connected to ground at one end and available to logic at the other end. The array of wires is customized by cutting open a predetermined combination of wires. Each chip will have a unique combination of wires or in other words, a unique code. The fusible array can have two distinct portions. The first, a readable portion, can be read by the system and is optional. The other portion is a secure and cannot be read by the system. Both portions are used to uniquely identify the chip. The readable unique portion and secure unique identification code are used to identify the configuration system and to modify or enable features or options of the system. A record is maintained of the information on the readable portion and this information can be used to determine the personality of the secure portion. It is also possible to use a single encryption for each chip, wherein the readable portion is encrypted to provide a second code. The second code corresponds to the secure portion. It is also possible for more than one array to be on a single chip so that multiple functions can be separately enabled.

It should be noted that the boundaries of the assembly, module and chip are artificial and that this invention can be used where such boundaries are sufficiently secure. As an example, more than one central processor could be packaged onto a single chip and each processor within a chip could have the secure enable function. Similarly, a central processor could include more than one chip and the secure enable function could be kept secure by packaging means where the secure enable function is within the same chip of the central processor chip set or where the chips are packaged within an assembly or module that is secure from tampering. It is possible to prevent tampering through the use of self destruct mechanisms, proprietary unique tools which are required to access the secure function or means that incorporate the off chip secure signals in an operational function such that the enable signal is a simple level but is part of a complex operation that could not easily be created off chip.

It is expected that the computer chip which is used to enable or determine the configuration will contain a 64 bit fuse macro. It is preferred that the computer chip include two 64 bit registers, one to encode the secure portion and one for the readable portion. As discussed above, the fuse macro is customized by cutting open combinations of wires.

Figure 3:
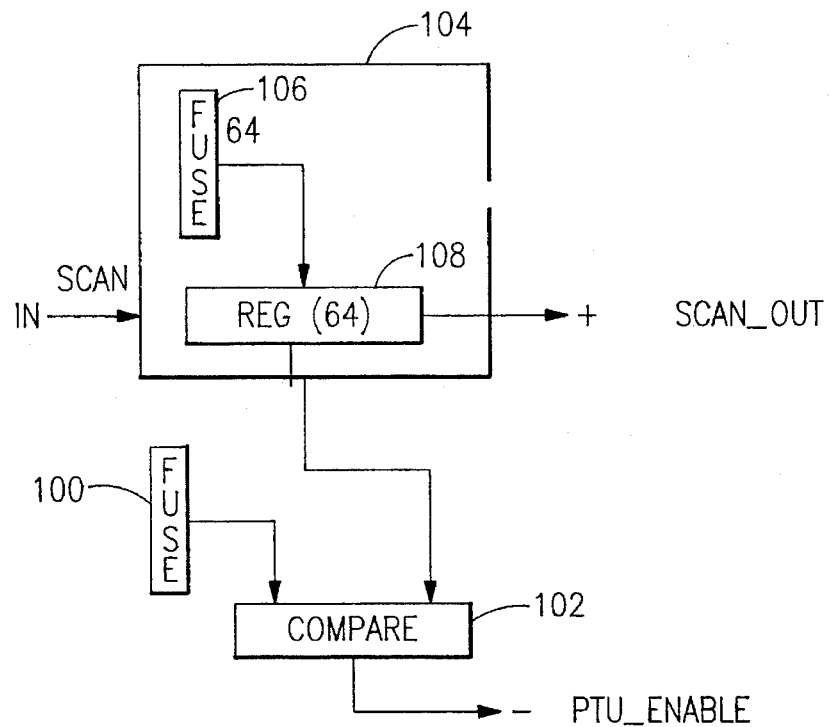
FIG. 3 illustrates the system of electronic hardware configuration according to a first embodiment of the invention.

As shown in FIG. 3, fuse 100 represents the secure portion and fuse 106 represents the readable portion. Any conventional means can be used to read the readable portion, for example, a scan means can be used to load the contents of the readable portion into a scanable register. In the representative configuration shown, the register has two purposes. The first is to read the readable unique fuse and the second, is to hold an entered key which must match the contents of the secure unique fuse 100 to enable one of the programmable functions on the chip.

In order to clarify the configuration, an example implementation is set forth. The readable fuse 106 is optional and contains a unique code which is read. The information obtained from the readable portion is used to cross reference, by look up table, enacryption or other means, a unique 64 bit code or key. The unique key is given to the purchaser of the chip(s) if the function(s) controlled by the secure portion are purchased. The key can be in an ASCII file, a hard copy hexadecimal number, on a floppy disk, on a CD-ROM or elctronically transmitted to the system. It is understood that these are representative examples and other means could be used to supply the key. The key is loaded, by any means known in the art, into the register 108. The key can be loaded during the power up routine or under system control. As described above, the comparator 102 compares the key to the secure unique code encoded on the secure fuse 100. If the codes match then the corresponding function is enabled.

The use of a 64 bit register is preferred so that the possibility of guessing the unique key is reduced. It is possible to use fewer bits in combination with other mechanisms to reduce the possibility of an unauthorized determination of the unique code. Some mechanisms might include a limit on the number of attempts or the performance of a main store operation between each attempt.

As a further example, a multichip module is provided, which can include up to ten control processors and five optional chip sites. The desired options or control processors are enabled if the the key or secret code which matches the code on the control processor or chip is supplied. It is preferred that the keys or secret codes be supplied during power on reset. As discussed above, the keys can be read from a diskette or read only memory (ROM), supplied by the service processor or input using a keyboard or other input device. Each function, for example an option or control processor, has a unique code which will enable that particular function. As discussed in detail above, the unique codes are contained in fuses in a computer chip.

According to the example described above, a multichip module with ten control processors and five optional chip sites is manufactured. However, a customer only desires a system configured with four control processors and no optional chips. The keys for enabling this configuration are supplied with the multichip module to the customer so that the desired configuration can be enabled.

The methods and configurations described herein can also be used as an enable next daisy chain function, wherein a new chip is enabled if one becomes disabled. This allows a failing computer chip to be taken off line and replaced with a spare functional chip without knowing the secret code for the spare chip.

Each multichip module can have a plurality of daisy-chained functionally equivalent computer chips, for example control processors are daisy chained to other control processors or memory chips are daisy chained to other memory chips, any of which may be enabled provided its enabling code has been purchased or is otherwise known by the user. Any unused chips may be used as redundant chips and can be brought online should an enabled chip fail. In the preferred embodiment, the invention provides an ENABLE NEXT feature, wherein a failing chip is taken offline and replaced with an unused chip in a manner which is transparent to the user.

Figure 4:
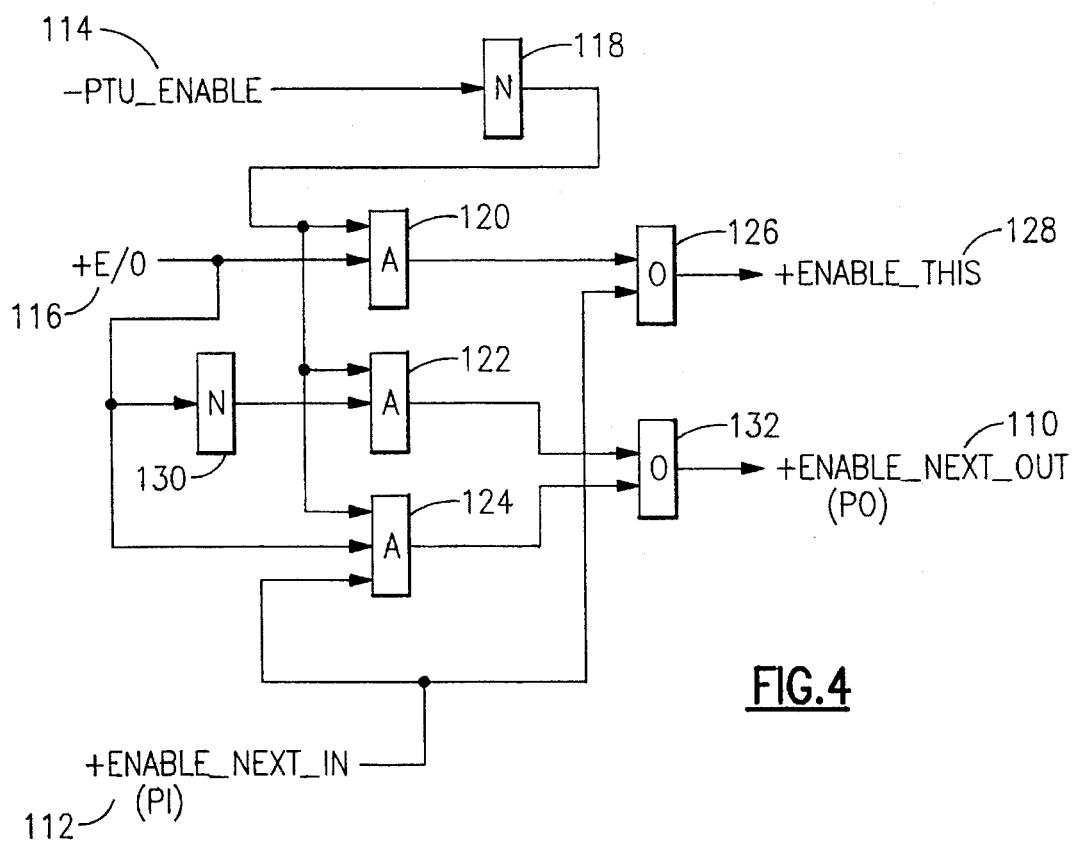
FIG. 4 illustrates the configuration and system used to enable one or more additional computer chip if one of the enabled chips fails.

Referring now to FIG. 4, there is shown a logic circuit for implementing the ENABLE NEXT feature. Each chip on the multichip module has associated therewith an ENABLE NEXT logic circuit daisy-chained to the ENABLE NEXT logic circuit of the next chip wherein an ENABLE_NEXT_OUT line 110 of a first chip is connected to the ENABLE_NEXT_IN line 112 of the next chip. Each chip in the chain has connected thereto an E/O latch line 116 which is held to logic I if the chip is functioning properly and to logic 0 if a chip failure is detected. If a chip is enabled and functioning properly, the PTU_ENABLE line 114 will be 0 and its complement 118 will be 1. The PTU_ENABLE complement 118 is input to AND gates 120, 122 and 124. The E/O line 116 is also connected to the input of AND gates 120 and 124, and its complement 130 to AND gate 122. When a chip is functioning properly and the E/O latch line is 1, AND gate 120 120 and OR gate 126 cause ENABLE_THIS line 128 to enable the chip. If the enabled chip fails or malfunctions and E/O becomes 0, ENABLE_THIS line 128 will take the chip offline, and OR gate 132 will cause ENABLE_NEXT_OUT line 110 to become active. Since the chips are daisy chained, the ENABLE_NEXT_IN line 112 of the next chip will be a 1 and cause the ENABLE_THIS line 128 of the next chip to enable that chip. In the event that the next chip is already enabled and functioning, AND gate 124 and OR 132 will activate the ENABLE_NEXT_OUT line 110 to the next chip and so on and so on until an unused chip is reached.

It is also possible to electronically configure hardware of a computer with an integrated cryptographic configuration processor computer chip. Most standard encryption algorithms can be used to encode the chip. However, it is preferred that a public key algorithm such as Rivest-Shamir-Adleman (RSA) is used and the example set forth below will refer to this method. However, it should be understood that these examples are not intended to be limiting and other techniques and public key encryption methods could be used within the scope of this invention.

Figures 5, 7:
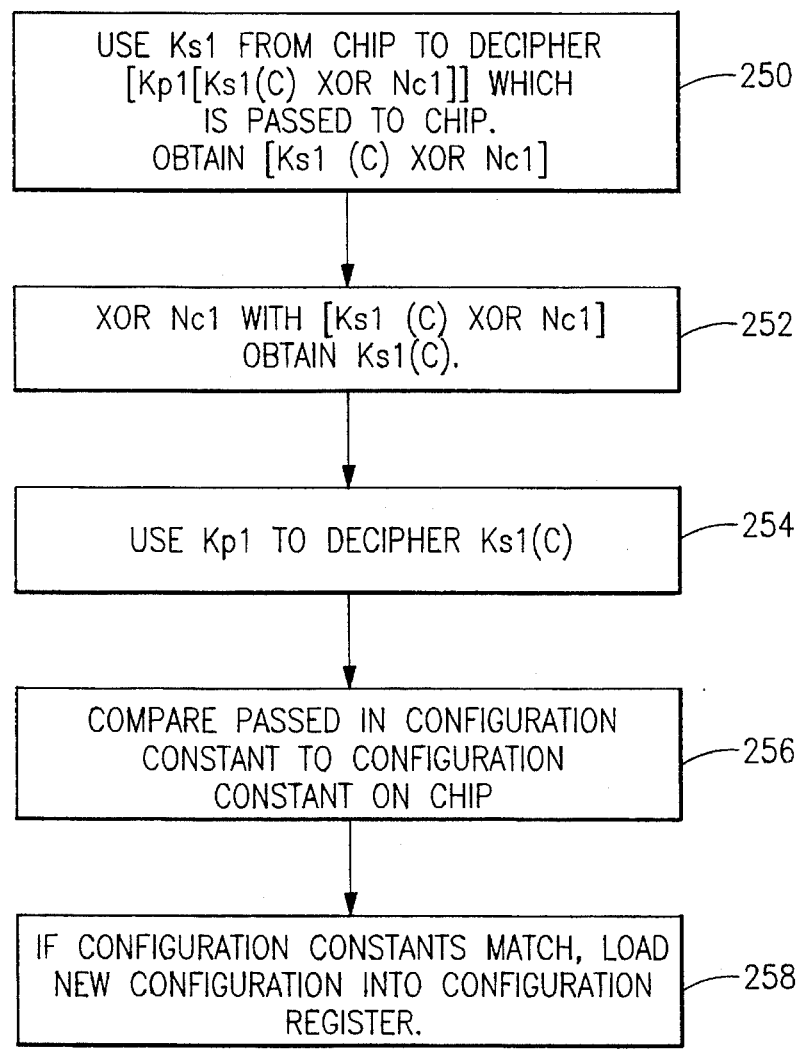
FIG. 5 is an example of a database configuration which correlates an identification number to a public key and a configuration signature for each chip which is manufactured.
FIG. 7 is a flow diagram of the method for deciphering a configuration constant which is passed to the chip to enable or disable a feature of the chip.

Each cryptographic configuration processor chip has associated with it a unique RSA key pair, a secret key (Ks) and a public key (Kp), of which Ks is permanently coded or installed within the chip. An example of one technique which could be used to code the chip is laser delete fuses. In addition, a configuration constant (C) is also permanently coded or installed within the chip. Prior to encoding Ks into the chip, it is used to encrypt the value of the configuration constant to produce a configuration signature Ks(C). After the secret key is encoded on the chip and used to encrypt the configuration constant, Ks is preferably deleted or removed from all databases. A database, an example of which is shown in FIG. 5, is maintained which correlates the serial number or other identification of each chip to the public key and the configuration signature (Ks(C)). Since Ks is unique for each chip, the configuration signature (Ks(C)) is also unique for each chip. The information stored in the database is used to securely enable the hardware configuration data.

Hardware can be electronically configured by sending a new configuration to the cryptographic configuration processor hardware with the appropriate unique configuration signature for the chip and the associated public key to sign the transaction. The signed configuration signature along with the new configuration data and the associated public key can be represented as follows:

$$Kp(Ks(C) \text{ xor } Nc), Nc, Kp$$

In the above formula, Nc represents the new hardware configuration and the remaining variables are as discussed, supra. Although Nc is not a secret value, the configuration processor via the use of this encryption technique ensures that the sender of the configuration data is authorized to send such data.

Figure 6:
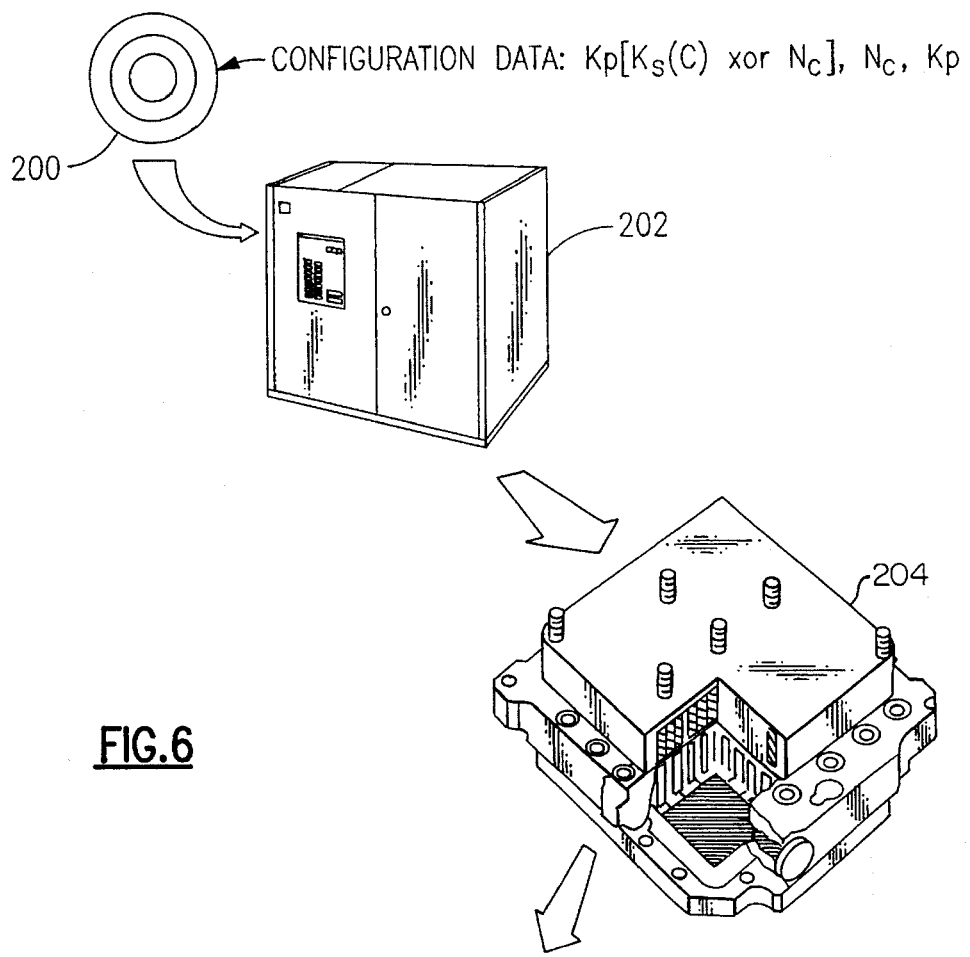
FIG. 6 is a high level overview of electronic hardware configuration according to a second embodiment of the invention.

As shown in FIG. 6, the signed configuration signature, configuration data, and associated public key 200 are provided, preferably on an optical disk, to the multichip module 204 in a computer 202. Each multichip module has at least one cryptographic configuration processor 210 which includes an engine 212, a configuration register 214, with each bit representing the various possible configurations, a public key register 215, an embedded configuration constant, C, and an embedded secret key, Ks, 216. This information is used to selectively enable and disable central processors and/or other functional chips 218, 220, 222, 224, 228, 230, 232, 234, in the module. It should be understood that any number of central processors or chips can be included.

It is only possible for the chip to decipher the new configuration signature since the deciphering requires the secret key, Ks, which is embedded into the chip. After the configuration signature is deciphered, the value of Nc must be unraveled from the signature via an exclusive or (XOR) function, as illustrated in FIG. 7. First, as shown in block 250, the secret key Ks is used to decipher the configuration signature [Kp[Ks(C)⊕Nc]] which results in [Ks(C)⊕Nc], where ⊕ is the XOR function. Then, as shown in block 252, Nc is XOR with [Ks(C)⊕Nc] to obtain Ks(C). Next, Ks(C) is deciphered using Kp in block 254. The configuration constants are then compared in block 256 to verify the identity of the chip. If the configuration constants are identical, then the new configuration, Nc, is loaded into the configuration register in block 258. The configuration signature for each chip is maintained in a database which is not be public and therefore unauthorized upgrades or modifications to the configuration are prevented.

This system requires only a single configuration signature for each computer since each new configuration can include many bits or values that reflect multiple upgrades or features for more than one chip or processor. Furthermore, since each computer or system has a unique configuration signature, if the configuration signature for a particular computer or system is compromised, only that computer or system can be altered or modified. Moreover, the use of a cryptographic algorithm reduces the probability that the contents will be unraveled. In addition, it is possible and preferred that the cryptographic configuration processor chip be physically designed to reduce the chance of determining the secret imbedded values (Ks).

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method for selectively activating the function of a computer chip, said method comprising the steps of:

providing a computer module in the form of a multichip module or an integrated circuit chip wherein said computer module includes a plurality of programmable features;

storing a secure code unique to the computer module in a first register on said computer module, said secure code including unique codes for each of said plurality of programmable features;

receiving a key code in a second register, said key code indentifying a feature or features of said computer module to be enabled;

comparing said key code to said secure code on said computer chip; and evaluating results of said comparing step, wherein if said key code matches said secure code, a feature or features identified by said key code are enabled.

2. A method, as recited in claim 1, wherein the secure code and the key code comprise keys in a public-key cryptographic algorithm.

3. A method, as recited in claim 2, wherein said secure code is encoded by a customizable array of fuses.

4. A method, as recited in claim 3, wherein said customizable array of fuses comprises fusible links.

5. A method, as recited in claim 2, wherein said secure code is stored in a programmable read only memory.

6. A method, as recited in claim 2, further comprising the steps of:

providing a plurality of computer chips;

connecting a first of said computer chips to a second of said computer chips if said first computer chip and said second computer chip have at least one programmable feature in common, wherein said first computer chip and the common programmable feature have been previously enabled but said second computer chip and the corresponding common programmable feature have not been enabled; and enabling the second of said computer chips and the corresponding common programmable feature if the first of said computer chips fails.

7. A method, as recited in claim 2, wherein said computer module further stores a configuration constant and implements said public key cryptographic algorithm, said secure code and said configuration constant being encrypted in combination using said cryptographic algorithm to produce a configuration signature, said configuration signature being unique for each computer module.

8. A method, as recited in claim 7, wherein said key code includes a public key, a signed configuration signature and configuration data.

9. A method, as recited in claim 8, wherein said comparing of said key code includes deciphering said signed configuration signature so that said configuration constant stored in said computer module can be compared to said received and deciphered configuration constant.

10. A method, as recited in claim 9, wherein said received configuration data is used to identify which one of said programmable features is enabled.

11. A method, as recited in claim 10, further comprising:

providing a plurality of computer chips;

connecting a first of said computer chips to a second of said computer chips if said first computer chip and said second computer chip have at least one programmable feature in common, wherein said first computer chip and the common programmable feature have been previously enabled but said second computer chip and the corresponding common programmable feature have not been enabled; and enabling the second of said computer chips and the corresponding common programmable feature if the first of said computer chips fails.

* * * * *